United States Patent Office 3,539,581
Patented Nov. 10, 1970

3,539,581
2-PHENYL-3-(4-HYDROXY-4-PHENYL-PIPERIDINO)-PROPIOPHENONES
Robert Bruce Moffett, Kalamazoo, Mich., assignor to The Upjohn Company, Kalamazoo, Mich., a corporation of Delaware
No Drawing. Filed July 25, 1968, Ser. No. 747,425
Int. Cl. C07d 29/20
U.S. Cl. 260—294.7                                    3 Claims

ABSTRACT OF THE DISCLOSURE

This invention relates to novel 2-phenyl-3-(4-hydroxy-4-phenylpiperidino)-propiophenones; it is inclusive of the free base and acid addition salt forms of the compounds embraced by the formula

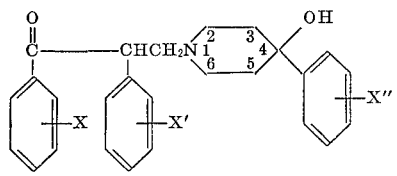

I wherein X, X' and X" are selected from the group consisting of hydrogen, lower-alkyl, fluorine, chlorine and bromine.

---

As used in this specification, the term "lower-alkyl" means alkyl of from one through four carbon atoms, e.g., methyl, ethyl, propyl, butyl, and isomeric forms thereof.

The compounds of Formula I are CNS stimulants; they antagonize convulsions and prevent death resulting from the administration of nicotine.

BRIEF SUMMARY OF THE INVENTION

The novel compounds embraced by Formula I exist either in the non-protonated (free base) form or in the protonated (acid addition salt) form, depending on the pH of the environment. They form stable protonates, i.e., acid addition salts, on neutralization of the free base with suitable acids, for example, hydrochloric, hydrobromic, sulfuric, phosphoric, nitric, acetic, benzoic, salicylic, glycolic, succinic, nicotinic, tartaric, maleic, malic, pamoic, methanesulfonic, cylohexanesulfamic, picric and lactic acids, and the like.

The novel 2-phenyl-3-(4-hydroxy-4-phenylpiperidino)-propiophenones of Formula I are prepared by mixing a corresponding 2-phenylacrylophenone of the formula

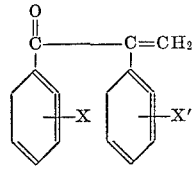

II wherein X and X' have the same meaning as above, with an appropriate secondary amine of the formula

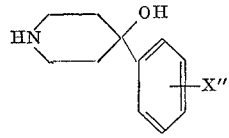

III wherein X" has the significance defined above.

2-phenylacrylophenones (II) are known in the art and can be prepared in the manner described in Bull. Soc. Chim. France 1176 (1963).

The secondary amines of Formula II are known in the art and can be prepared by published methods. For example, 4-hydroxy-4-phenylpiperidine can be produced in accordance with the procedure described in J. Amer. Chem. Soc. 78, 1702 (1956); 4 - hydroxy - 4 - (p-fluorophenyl)piperidine and the corresponding p-chloro and p-alkyl compounds by the method of J. Med. Pharm. Chem. 1, 281 (1959); U.S. Pat. 2,973,363 (1961).

In carrying out the reaction between the acrylophenones (II) and the secondary amines (III), the two reactants are merely mixed. Inert solvents, e.g., an alkanol such as methanol or ethanol, can be employed, if desired. Heating of the reaction mixture is not necessary, but can be used to facilitate solution. The molecular ratio of the compounds of Formula II and Formula III can be varied, substantially equimolar ratios having been found satisfactory. The time required for the completion of the reaction depends upon such factors as the particular reactants, their solubility, their relative amounts, thoroughness of mixing, and the like. Therefore, it will be understood that the optimum reaction time will vary for each set of reaction conditions. Ordinarily, reaction times ranging from about several minutes to about several hours are suitable. After completion of the reaction between the compounds of Formula II and Formula III, the product (I) is isolated from the reaction mixture in its free base form, using conventional procedures such as filtration, solvent evaporation, solvent extraction, chromatography or crystallization, or a combination of these methods. The free bases so obtained can be purified, e.g., by recrystallization from a solvent or suitable mixture of solvents. The free base form can be converted to any acid addition salt by neutralization with an acid, e.g., any of those given above.

The compounds of Formula I stimulate the central nervous system in mammals and animals, e.g., mice, rats and birds; they antagonize convulsions and prevent death resulting from the administration of nicotine to mice.

DETAILED DESCRIPTION

It is to be understood that the invention is not to be limited to the exact details of operation or exact compositions shown and described herein, as obvious modifications and equivalents will be apparent to those skilled in the art, and the invention is therefore to be limited only by the scope of the appended claims.

PREPARATION 1

*2-phenylacrylophenone (or 1,2-diphenyl-2-propen-1-one)*
(II)

A solution of 294 g. (1.5 moles) of phenyl benzyl ketone (also known as desoxybenzoin), 360 ml. of 37% formaldehyde, and 7.5 ml. of piperidine in 1.35 l. of methanol in a 5 l. flask is stirred under reflux for about 3 hours and allowed to stand for about 16 hours. The mixture is diluted with 2 l. of water and the resulting oil extracted with 2 l. of ether in 2 portions. The ether solutions are washed successively with 150 ml. of aqueous 5% hydrochloric acid solution, 200 ml. of 5% aqueous sodium bicarbonate solution, 300 ml. of water, saturated aqueous sodium chloride solution, and dried over sodium sulfate. After filtration, the solvent is evaporated and the resulting syrup distilled from a Claisen flask to give 266.6 g. (85% yield) of 2-phenylacrylophenone (II) as a colorless oil having a boiling point of 205 to 207° C. (at 15 mm. of Hg.). This material crystallizes and is stable at 0° C.

Following the procedureof Preparation 1, but substituting for phenyl benzyl ketone the following:

(1) phenyl p-chlorobenzyl ketone,
(2) p-bromophenyl p-bromobenzyl ketone,
(3) m-chlorophenyl m-chlorobenzyl ketone,
(4) p-fluorophenyl benzyl ketone, (5) p-chlorophenyl p-methylbenzyl ketone,
(6) o-propylphenyl o-bromobenzyl ketone,
(7) o-bromophenyl m-ethylbenzyl ketone,
(8) m-fluorophenyl p-butylbenzyl ketone,
(9) p-methylphenyl p-methylbenzyl ketone,
(10) o-butylphenyl p-butylbenzyl ketone, etc., there can be prepared, respectively,
(1) 2-(p-chlorophenyl)acrylophenone (II),
(2) 2-(p-bromophenyl)-4'-bromoacrylophenone (II),
(3) 2-(m-chlorophenyl)-3'-chloroacrylophenone (II),
(4) 2-phenyl-4'-fluoroacrylophenone (II),
(5) 2-(p-methylphenyl)-4'-chloroacrylophenone (II),
(6) 2-(o-bromophenyl)-2'-propylacrylophenone (II),
(7) 2-(m-ethylphenyl)-2'-bromoacrylophenone (II),
(8) 2-(p-butylphenyl)-3'-fluoroacrylophenone (II),
(9) 2-(p-methylphenyl)-4'-methylacrylophenone (II),
(10) 2-(p-butylphenyl)-2'-butylacrylophenone (II), etc.

EXAMPLE 1

*2-phenyl-3-(4-hydroxy-4-phenylpiperidino)-propiophenone (I)*

A mixture of 35.4 g. (0.2 mole) of 4-hydroxy-4-phenyl-piperidine (III) and 41.6 g. (0.2 mole) of 2-phenyl-acrylophenone (II) and 100 ml. of ethanol is warmed to effect solution. Crystals soon separate and after standing for about 3 hours an additional 200 ml. of ethanol is added to dissolve the product at the boiling point. After filtering while hot and then cooling, the product is collected, washed with ethanol and dried to give 62.5 g. (81.3% yield) of white crystals of 2-phenyl-3-(4-hydroxy-4-phenylpiperidino)-propiophenone (I), having a melting point of 142.5 to 144.5° C. Infrared and nuclear magnetic resonance (NMR) spectra support the structure proposed for the thus produced compound.

*Analysis.*—Calcd. for $C_{26}H_{27}NO_2$ (percent): C, 81.00; H, 7.06; N, 3.63. Found (percent): C, 81.40; H, 7.35; N, 3.61.

Following the procedure of Example 1, but substituting for 2-phenylacrylophenone (II) the following:

(1) 2-(p-chlorophenyl)acrylophenone (II),
(2) 2-(p-bromophenyl)-4'-bromoacrylophenone (II),
(3) 2-(m-chlorophenyl)-3'-chloroacrylophenone (II),
(4) 2-phenyl-4'-fluoroacrylophenone (II),
(5) 2-(p-methylphenyl)-4'-chloroacrylophenone (II),
(6) 2-(o-bromophenyl)-2'-propylacrylophenone (II),
(7) 2-(m-ethylphenyl)-2'-bromoacrylophenone (II),
(8) 2-(p-butylphenyl)-3'-fluoroacrylophenone (II),
(9) 2-(p-methylphenyl)-4'-methylacrylophenone (II),
(10) 2-(p-butylphenyl)-2'-butylacrylophenone (II), etc., there can be prepared, respectively,
(1) 2-(p-chlorophenyl)-3-(4-hydroxy-4-phenylpiperidino)-propiophenone (I),
(2) 2-(p-bromophenyl)-3-(4-hydroxy-4-phenylpiperidino)-4'-bromopropiophenone (I),
(3) 2-m-chlorophenyl)-3-4-hydroxy-4-phenylpiperidino)-3'-chloropropiophenone (I),
(4) 2-phenyl-3-(4-hydroxy-4-phenylpiperidino)-4'-fluoropropiophenone (I),
(5) 2-(p-methylphenyl)-3-(4-hydroxy-4-phenylpiperidino)-4'-chloropropiophenone (I),
(6) 2-(o-bromophenyl)-3-(4-hydroxy-4-phenylpiperidino)-2'-propylpropiophenone (I),
(7) 2-(m-ethylphenyl)-3-(4-hydroxy-4-phenylpiperidino)-2'-bromopropiophenone (I),
(8) 2-(p-butylphenyl)-3-(4-hydroxy-4-phenylpiperidino)-3'-fluoropropiophenone (I),
(9) 2-(p-methylphenyl)-3-4-hydroxy-4-phenylpiperidino)-4'-methylpropiophenone (I),
(10) 2-(p-butylphenyl)-3-(4-hydroxy-4-phenylpiperidino)-2'-butylpropiophenone (I), etc.

Following the procedure of Example 1, but substituting for 4-hydroxy-4-phenylpiperidine (III) the following:

(1) 4-hydroxy-4-(p-fluorophenyl)piperidine (III),
(2) 4-hydroxy-4-(p-chlorophenyl)piperidine (III),
(3) 4-hydroxy-4-(m-bromophenyl)piperidine (III),
(4) 4-hydroxy-4-(o-fluorophenyl)piperidine (III),
(5) 4-hydroxy-4-(m-chlorophenyl)piperidine (III),
(6) 4-hydroxy-4-(p-methylphenyl)piperidine (III),
(7) 4-hydroxy-4-(p-ethylphenyl)piperidine (III),
(8) 4-hydroxy-4-(m-propylphenyl)piperidine (III),
(9) 4-hydroxy-4-(m-butylphenyl)piperidine (III),
(10) 4-hydroxy-4-(o-methylphenyl)piperidine (III), etc., there can be prepared, respectively,
(1) 2-phenyl-3-[4-hydroxy-4-(p-fluorophenyl)piperidino] propiophenone (I),
(2) 2-phenyl-3-[4-hydroxy-4-(p-chlorophenyl)piperidino]-propiophenone (I),
(3) 2-phenyl-3-[4-hydroxy-4-(m-bromophenyl)piperidino]-propiophenone (I),
(4) 2-phenyl-3-[4-hydroxy-4-(o-fluorophenyl)piperidino] propiophenone (I),
(5) 2-phenyl-3-[4-hydroxy-4-(m-chlorophenyl)piperidino]-propiophenone (I),
(6) 2-phenyl-3-[4-hydroxy-4-(p-methylphenyl)piperidino]-propiophenone (I),
(7) 2-phenyl-3-[4-hydroxy-4-(p-ethylphenyl)piperidino] propiophenone (I),
(8) 2-phenyl-3-[4-hydroxy-4-(m-propylphenyl)piperidino]-propiophenone (I),
(9) 2-phenyl-3-[4-hydroxy-4-(m-butylphenyl)piperidino] propiophenone (I),
(10) 2-phenyl-3-[4-hydroxy-4-(o-methylphenyl)piperidino]-propiophenone (I), etc.

Following the procedure of Example 1, but substituting for 2-phenylacrylophenone (II) and 4-hydroxy-4-phenylpiperidine (III) the following:

(1) 2-(p-chlorophenyl)acrylophenone (II) and 4-hydroxy-4-(p-fluorophenyl)piperdine (III),
(2) 2-(p-bromophenyl)-4'-bromoacrylophenone (II) and 4-hydroxy-4-(p-chlorophenyl)piperdine (III),
(3) 2-(m-chlorophenyl)-3'-chloroacrylophenone (II) and 4-hydroxy-4-(m-bromophenyl)piperidine (III),
(4) 2-phenyl-4'-fluoroacrylophenone (II) and 4-hydroxy-4-(o-fluorophenyl)piperidine (III),
(5) 2-(p-methylphenyl)-4'-chloroacrylophenone (II) and 4-hydroxy-4-(m-chlorophenyl)piperidine (III),
(6) 2-(o-bromophenyl)-2'-propylacrylophenone (II) and 4-hydroxy-4-(p-methylphenyl)piperidine (III),
(7) 2-(m-ethylphenyl)-2'-bromoacrylophenone (II) and 4-hydroxy-4-(p-ethylphenyl)piperidine (III),
(8) 2-(p-butylphenyl)-3'-fluoroacrylophenone (II) and 4-hydroxy-4-(m-propylphenyl)piperdine (III),
(9) 2-(p-methylphenyl)-4'-methylacrylophenone (II) and 4-hydroxy-4-(m-butylphenyl)piperidine (III),
(10) 2-(p-butylphenyl)-2'-butylacrylophenone (II) and 4 - hydroxy - 4 - (o-methylphenyl)piperidine (III), etc., there can be prepared, respectively,
(1) 2-(p-chlorophenyl)-3-[4-hydroxy-4-(p-fluorophenyl) piperidino]-propiophenone (I),
(2) 2-(p-bromophenyl)-3-[4-hydroxy-4-(p-chlorophenyl)-piperidino]-4'-bromopropiophenone (I),
(3) 2-(m-chlorophenyl)-3-[4-hydroxy-4-(m-bromophenyl)-piperidino]-3'-chloropropiophenone (I),
(4) 2-phenyl-3-[4-hydroxy-4-(o-fluorophenyl)piperidino] 4'-fluoropropiophenone (I),
(5) 2-(p-methylphenyl)-3-[4-hydroxy-4-(m-chlorophenyl)-piperidino]-4'-chloropropiophenone (I),
(6) 2-(o-bromophenyl)-3-[4-hydroxy-4-(p-methylphenyl)-piperidino]-2'-propylpropiophenone (I),
(7) 2-(m-ethylphenyl)-3-[4-hydroxy-4-(p-ethylphenyl) piperidino]-2'-bromopropiophenone (I),
(8) 2-(p-butylphenyl)-3-[4-hydroxy-4-(m-propylphenyl) piperidino]-3'-fluoropropiophenone (I), (9) 2-(p-methylphenyl)-3-[4-hydroxy-4-butylphenyl) piperidino]-4'-methylpropiophenone (I),

(10) 2-(p-butylphenyl)-3-[4-hydroxy-4-(o-methylphenyl) piperidino]-2'-butylpropiophenone (I), etc.

EXAMPLE 2

*2-phenyl-3-(4-hydroxy-4-phenylpiperidino)-propiophenone hydrochloride (I)*

A suspension of 61 g. (0.158 mole) of the free base form of 2-phenyl-3-(4-hydroxy-4-phenylpiperidino)-propiophenone (I) obtained in Example 1 in 500 ml. of 2-propanol and 20 ml. of about 9 N methanolic hydrogen chloride is warmed to boiling and cooled. The solid that separates is collected, washed successively with 2-propanol, acetone, and ether, and dried, giving 66.1 g. of white solid, having a melting point of 173 to 177° C. This material is recrystallized by boiling with methanol, filtering and diluting the filtrate with ether. Crystals separate slowly, yielding 50 g. (75% yield) of white solid 2-phenyl - 3-(4-hydroxy-4-phenylpiperidino)-propiophenone hydrochloride (I), melting between 201 and 202.5° C.

*Analysis.* — Calcd. for $C_{26}H_{28}ClNO_2$ (percent): C, 74.00; H, 6.69; Cl, 8.40; N, 3.32; O, 7.58. Found (percent): C, 73.91; H, 6.63; Cl, 8.21; N, 3.41; O, 7.61.

On neutralization of the thus obtained hydrochloride (I) with sodium hydroxide or potassium hydroxide, the free base form, 2-phenyl-3-(4-hydroxy-4-phenylpiperidino)-propiophenone (I) is produced.

Following the procedure of Example 2, but substituting for hydrogen chloride another acid, e.g., hydrobromic, sulfuric, phosphoric, acetic, benzoic, salicylic, citric, succinic, malic, cyclohexanesulfamic, etc., the corresponding acid addition salt of 2-phenyl-3-(4-hydroxy-4-phenyl-piperidino)-propiophenone (I) can be prepared.

Following the procedure of the immediately preceding paragraph and of Example 2, but substituting for the free base form of 2-phenyl-3-(4-hydroxy-4-phenylpiperidino)-propiophenone (I) other compounds embraced by Formula I, such as those designated (1) through (10) in the paragraph directly above Example 2, their corresponding acid addition salts can be prepared.

Modes of administration and dosages of the products of Formula I of this invention for use as central nervous system stimulants are analogous to those disclosed in U.S. Pat. 3,203,962.

I claim:

1. A compound selected from the group consisting of (1) a compound of the formula

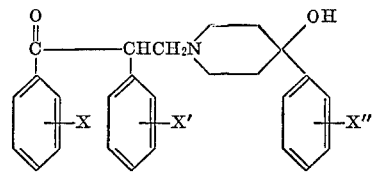

wherein X, X' and X" are selected from the group consisting of hydrogen, lower-alkyl, fluorine, chlorine and bromine, and (2) an acid addition salt thereof.

2. A compound of claim 1 wherein X, X' and X" are hydrogen, namely, 2-phenyl-3-(4-hydroxy-4-phenylpiperidino)-propiophenone.

3. An acid addition salt of a compound of claim 1 wherein X, X' and X" are hydrogen, and the acid addition salt is that of hydrogen chloride, namely, 2-phenyl-3-(4-hydroxy-4-phenylpiperidino)-propiophenone hydrochloride.

References Cited

UNITED STATES PATENTS 3,203,962    8/1965    Huebner.

NORMA S. MILESTONE, Primary Examiner

S. D. WINTERS, Assistant Examiner

U.S. Cl. X.R.

260—293.4, 294, 590; 424—267